Apr. 24, 1923.
W. M. RAPP
REFRIGERATOR
Original Filed June 21, 1920    2 Sheets-Sheet 2
1,452,756
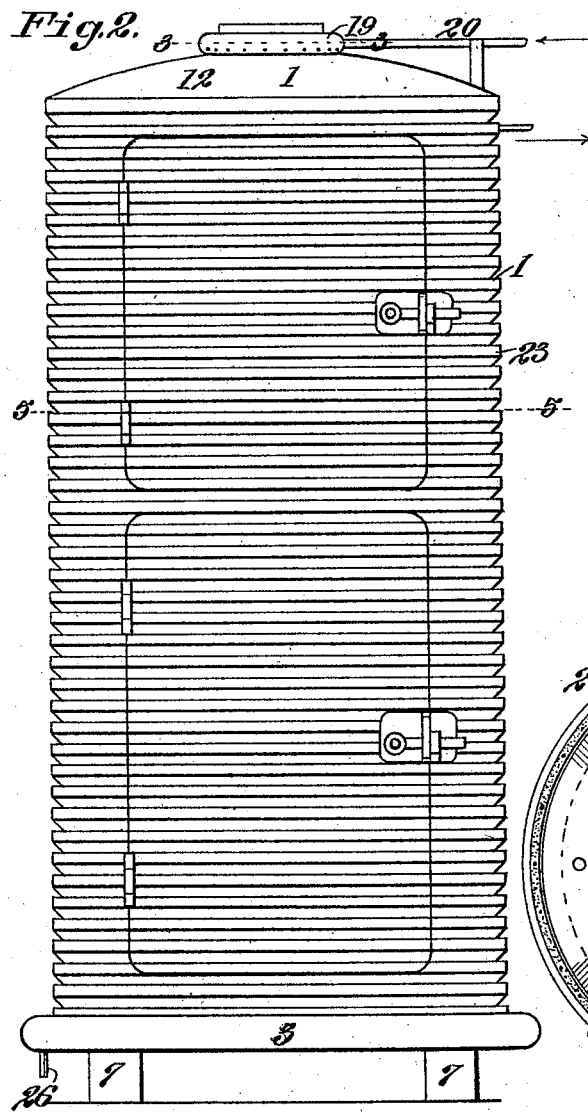
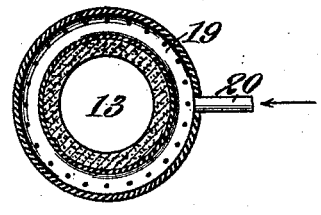
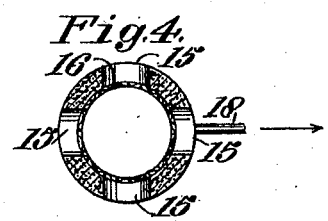
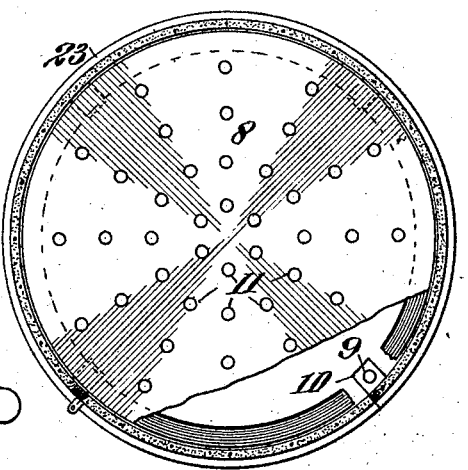
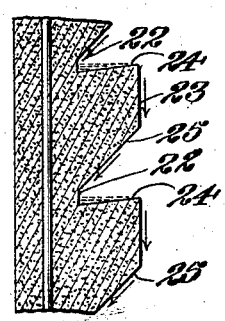

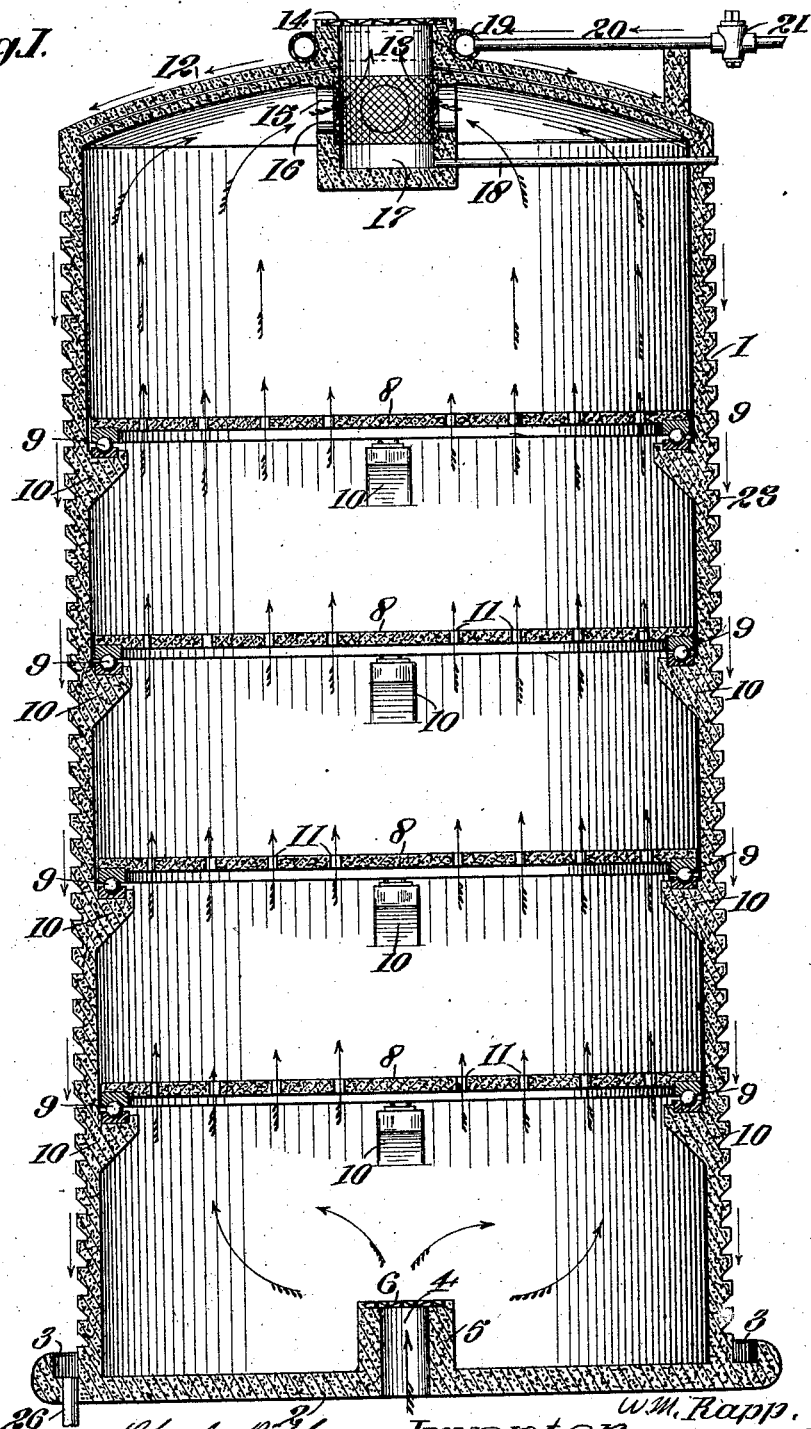

Patented Apr. 24, 1923.

1,452,756

UNITED STATES PATENT OFFICE.

WILLIAM M. RAPP, OF SAN FRANCISCO, CALIFORNIA, ASSIGNOR, BY DIRECT AND MESNE ASSIGNMENTS, TO VAPO CORPORATION, A CORPORATION OF CALIFORNIA.

REFRIGERATOR.

Application filed June 21, 1920, Serial No. 390,556. Renewed December 21, 1922.

*To all whom it may concern:*

Be it known that I, WILLIAM M. RAPP, a citizen of the United States, and resident of the city of San Francisco, county of San Francisco, and State of California, have invented a new and useful Improvement in Refrigerators, of which the following is a specification.

The present invention relates in general to refrigerators for preserving food stuffs, and has reference more particularly to a so-called iceless refrigerator in which a receptacle is equipped with means for realizing the advantages to be gained by using the evaporation of a liquid as a refrigerating or cooling medium.

The primary object of the invention is to provide a receptacle for storing food stuff which is so constructed that with the aid of a liquid evaporation, preferably the evaporation of water, the food stuff may be maintained in a fresh and perfect state of preservation.

As far as concerns one embodiment of the invention, it is proposed to provide a household refrigerator which may be produced at a comparatively low cost, and used as an exceedingly convenient and practical means for maintaining food used in the household in a fresh and perfect state of preservation without the use of ice as a refrigerating or cooling medium. There have been attempts to produce these so-called "ice-less refrigerators," but such attempts have fallen short of offering a practical solution of the problems involved. For instance, when water or the like liquid is treated by the evaporating method as a cooling or refrigerating meduim, it must be distributed over the surface of the receptacle in such a manner as to realize a most effective evaporation, as in reality, it is this evaporation, and not the temperature of the water, which produces the cooling or refrigerating effect. Then again, ventilation of the receptacle is also a most important consideration.

The preferred embodiment of the invention is illustrated in the accompanying drawing. In said drawing Fig. 1 is a central vertical section of the receptacle; Fig. 2 is a side elevation; Fig. 3 is a sectional view on the line 3—3 Fig. 2; Fig. 4 is a cross section of the ventilator in the dome of the receptacle; Fig. 5 is a sectional view on the line 5—5 Fig. 2; and Fig. 6 is an enlarged detail view of a portion of the wall of the receptacle.

Referring now to the drawings in detail: it is proposed to mould a receptacle 1 from concrete or any other suitable material, so that the same will have a closed bottom 2, surrounded by a relatively narrow annular trough 3, and with a central air intake 4, produced by an upstanding sleeve 5 having a screen or the like 6, covering the open end of the same within the receptacle.

The receptacle may be supported above the ground by means of feet or the like 7 so as to enable the intake 4 to accommodate sufficient air for ventilating purposes.

Arranged within the receptacle are a plurality of shelves 8 each of which being supported with freedom of rotation by antifriction devices, such as the ball bearings 9 which are supported by lugs 10. Each shelf will have a series of perforations 11 to permit a free circulation of air through the receptacle.

The top of the receptacle will be constructed preferably as a dome 12 with a central ventilating discharge 13. This ventilating discharge, in order to exclude dust and other foreign matter from the inside of the receptacle will be equipped with a screen closure 14, and with openings 15 arranged in its side and also covered by screens or the like 16. It is to be noted that the openings 15 are arranged in the side of the discharge and slightly above the bottom thereof, to provide a sump 17 for rain water with a pipe 18 adapted to carry the same off. By providing the openings 15 in the side of the discharge, not only will they operate to exclude dust and the like, but they will also exclude water from the receptacle. The discharge extends slightly above the dome 12, and will offer a convenient means of accommodating the manifold distributor 19 of the water supply, the evaporation of which is to be used as a cooling medium. The water supply may be introduced to the manifold distributor 19 through a pipe 20 which is equipped with a control valve 21. The manifold distributor 19 is best illustrated in Fig. 3, and is equipped with a series of perforations, around its circumference, so as to provide an even distribution of water over the entire surface of the dome 12.

An important feature of the invention resides in the means for producing an effective evaporation of the water as it is distributed over the sides of the receptacle, to which end it is proposed, to construct the sides of the receptacle with a roughened or irregular surface, preferably consisting of a multiplicity of channels or grooves 22 extending radially around the circumference of the receptacle, and leaving, as it were, a multiplicity of annular rings, or fins, 23, presented across the path of the water, the top sides 24 thereof being practically parallel to one another and with their bottom sides arranged on a slant or bevel 25. The receptacle as constructed in accordance with this suggestion would assume practically a corrugated appearance; the water being discharged over the dome will circulate by gravity, in and out of these channels, and over the annular rings, downwardly of the receptacle, and will be retarded by the channels and rings, so that it will readily evaporate and bring about the desired cooling effect. The water may be collected from the bottom of the receptacle by the trough 3 and carried off by a waste pipe 26.

As heretofore mentioned the receptacle may be moulded from concrete or any other material, in sections or as a complete structure, with suitable reinforcing elements, and of course doors will be provided for enabling access to be had to the inside of the same. The hinges for the doors may be imbedded in the material of which the receptacle is constructed at the time of moulding the same.

I claim:

A refrigerator of the class described, comprising a moulded receptacle including a dome shaped top and a closed bottom, a multiplicity of circumferential channels formed in the outer surface of the receptacle, and a trough at the end of said channels, a ventilator in the top of the receptacle, shelves within the receptacle each of which being perforated to permit a circulation of air through the receptacle, the ventilator in the top of the receptacle comprising a casing extending within the receptacle and above the top thereof, said casing having a screened opening above the receptacle and a plurality of openings in the sides thereof, which extend within the receptacle, the bottom of the casing having a sump with a discharge pipe communicating therewith, means for distributing the liquid over the top of the receptacle with the said liquid adapted to gravitate over the outer surface of the receptacle, and in and out of said circumferential channels, said liquid distributing means comprising a distributing manifold surrounding that part of the ventilator casing, extending above the top of the receptacle, said manifold distributor having a series of perforations and a liquid supply pipe communicating therewith.

WILLIAM M. RAPP.